(12) United States Patent
Hampe et al.

(10) Patent No.: US 6,660,426 B2
(45) Date of Patent: Dec. 9, 2003

(54) MULTI-CELL STORAGE BATTERY WITH GAS VENT IN A COVER ASSEMBLY

(75) Inventors: Werner Hampe, Marsberg-Helminghausen (DE); Jürgen Freitag, Marsberg-Bredelar (DE); Wilhelm Cramer, Brilon-Messinghausen (DE)

(73) Assignee: Accumulatorenwerke Hoppecke Carl Zoellner & Sohn GmbH & Co. KG (DE)

( * ) Notice: Subject to any disclaimer, the term of this patent is extended or adjusted under 35 U.S.C. 154(b) by 296 days.

(21) Appl. No.: 09/855,882

(22) Filed: May 15, 2001

(65) Prior Publication Data

US 2002/0031699 A1 Mar. 14, 2002

(30) Foreign Application Priority Data

May 15, 2000 (DE) .......................................... 100 23 746

(51) Int. Cl.⁷ ................................................ H01M 2/12
(52) U.S. Cl. ............................................ 429/82; 429/84
(58) Field of Search ..................................... 429/82, 84

(56) References Cited

U.S. PATENT DOCUMENTS 4,682,262 A * 7/1987 Monsell ........................ 361/6
5,561,001 A * 10/1996 Gurtler ........................ 429/86

FOREIGN PATENT DOCUMENTS

| EP | 584528 A1 | * 7/1993 | ............ H01M/2/12 |
| EP | 756338 A1 | * 7/1996 | ............ H01M/2/12 |
| EP | 1156539   | * 5/2001 | ............ H01M/2/12 |

* cited by examiner

*Primary Examiner*—Mark Ruthkosky
(74) *Attorney, Agent, or Firm*—Cantor Colburn LLP

(57) ABSTRACT

This invention relates to a multi-cell storage battery including a housing and, enclosing the housing in gas-tight fashion, a housing cover assembly having an upper cover panel and a lower cover panel with a degassing duct between the upper and lower cover panels which encompasses a multiple array of interconnected, mutually matched labyrinth chambers, fluidically links all cells, opens out at a forward end into at least one gas vent, and is closed off by a spark suppressor. To arrive at a storage battery in which adequate degassing is assured under all operating conditions while at the same time any leakage of acid accumulated in the degassing duct is largely prevented even when the internal pressure is high, the invention proposes a design whereby the gas vent is positioned at an essentially perpendicular angle relative to the direction of gas flow through the spark suppressor while in the area between the spark suppressor and the gas vent the degassing duct is provided with a widened section forming a collecting chamber which, when the storage battery is in its normal position, is situated underneath the gas vent.

13 Claims, 3 Drawing Sheets

MULTI-CELL STORAGE BATTERY WITH GAS VENT IN A COVER ASSEMBLY

FIELD OF THE INVENTION

This invention relates to a multi-cell storage battery with a housing and, enclosing the housing in gas-tight fashion, a housing cover assembly consisting of an upper and a lower cover panel, with a degassing duct between the upper and lower cover panels which duct encompasses a multiple array of interconnected, mutually matched labyrinth chambers, fluidically links all cells, opens out at its forward end into at least one gas vent, and is closed off by a spark suppressor.

DESCRIPTION OF THE RELATED ART

Storage batteries have been known from prior art. They incorporate different electrodes which in the case of a multi-cell battery are combined into a single cell and contained in a housing. The top of the housing is sealed with a cover assembly which in most cases consists of an upper and a lower cover panel, with a cavity between the upper and the lower cover panels serving for the draining of acid. A storage battery of this type has been described for instance in EP 0 584 528 B1.

SUMMARY OF THE INVENTION

In lead storage batteries, commonly used in motor vehicles, the electrodes consist of lead and are configured as grids where the grid mesh on the positive side is filled with lead oxide and on the negative side with so-called lead sponge. The electrolyte is usually sulfuric acid, applied either in liquid form or thickened into a gel. The charging process induces chemical reactions in the electrolyte which, among other things, also result in the development of gas. To counteract any uncontrolled pressure buildup within the battery housing and, in a worst-case situation, to prevent an explosive gas discharge, the battery is provided with gas vents. In most cases these are located in the cover assembly.

For the dissipation of flammable gases which are generated for instance through electrolyte evaporation as a result of the charging process, prior art has employed two fundamental degassing methods. One approach provides for the gas to be drawn off into the atmosphere surrounding the storage battery directly by way of the plugs sealing the individual cell ports. One such degassing method is described for instance in EP 0 756 338. The other approach has the gas vented through a central degassing duct. In this latter gas-venting design, the individual cells of the storage battery are connected with one another via a common degassing duct which is typically integrated into the battery cover and extends in a transverse direction relative to the cells. The gas is usually vented from the battery via the degassing duct through the forward end of the housing cover for dissipation into the atmosphere. This latter concept has been described, inter alia, in EP 0 305 822 A1 and U.S. Pat. No. 5,561,001. In both of these design versions, the gas to be eliminated from the storage battery first passes through a filter disk, the so-called frit. This is intended primarily to prevent the highly flammable gas from backfiring into the storage battery.

When the storage battery is handled improperly, but also when as part of necessary mechanical maintenance work the battery is moved from its normal position and is turned or tilted, acid leaks from the battery cells and seeps into the hollow space in the housing cover. This, of course, is undesirable, and especially so because a sufficiently high internal pressure level will cause the leaking acid to be pushed through the gas vent to the outside of the battery housing. It is a particularly bothersome problem when upon the completed assembly of a motor vehicle the starter battery to be installed must be turned or tipped out of its level position, causing acid to leak from the battery.

Another problem with prior-art storage batteries of the type mentioned is that water can enter into the battery through the gas vent. Such water may even carry dirt particles into the degassing duct and clog up the spark suppressor. Unimpeded degassing will then no longer be possible and in the worst case enough pressure may build up inside the storage battery to cause the latter to burst apart.

SUMMARY OF THE INVENTION

To avoid the above-mentioned problems, it is the objective of this invention to provide a multi-cell storage battery containing a central degassing duct, ensuring adequate gas venting under all and any operating conditions while at the same time largely preventing any acid in the degassing duct from leaking out even when under high internal pressure.

According to the invention, this is accomplished by essentially positioning the gas vent perpendicular to the flow direction through the spark suppressor and by widening the degassing duct into a collecting chamber in the area between the spark suppressor and the gas vent which collecting chamber is situated underneath the gas vent of the storage battery in its normal position.

This invention thus introduces an innovative storage-battery design in which the degassing duct features a collecting chamber in the area between the spark suppressor and the gas vent. The collecting chamber serves to trap any residual amounts of acid that may have penetrated through the spark suppressor for instance due to improper handling or to excessive internal pressure. When the battery is in its normal position, the collecting chamber is situated underneath the gas vent which gas vent extends in an essentially perpendicular direction relative to the flow direction through the spark suppressor. As a result, any acid that leaked out and is forced through the spark suppressor will be gravity-fed into the collecting chamber rather than exiting to the outside via the gas vent that extends in an essentially perpendicular direction relative to the flow of the vented gas. At the same time, the design of this invention assures adequate degassing under all operating conditions. Gas exiting from the cells within the storage battery flows through the spark suppressor in the venting direction and from there through the gas vent to the outside atmosphere around the battery. That gas flow is not obstructed by the collecting chamber situated underneath the gas vent.

As another advantageous feature of the design according to this invention, the collecting chamber will trap fluids penetrating from the outside via the gas vent, for instance water, preventing them from entering the degassing system of the battery. Similarly, dirt particles entering through the gas vent will be trapped in the collecting chamber, which in advantageous fashion prevents contamination or clogging of the mesh-like screen of the spark suppressor. In summary, the design according to this invention thus prevents any acid in the degassing duct from leaking out even if under high internal pressure, it largely prevents undesirable fluids or dirt particles from entering via the gas vent, and it assures adequate gas venting under all operating conditions.

According to one aspect of this invention, the collecting chamber is sufficiently large to hold leaking acid as well as fluids and dirt particles that have penetrated through the gas vent. The collecting chamber is so dimensioned that, while being large enough to accept residual amounts of leaking acid so as to largely prevent these from exiting into the outside atmosphere around the battery, the space constituted of the collecting chamber and the area between the gas vent and the spark suppressor is not large enough to allow easily flammable gas to accumulate in any hazardous quantities. Specifically, that space is held within limits where even if all of the gas in the entire area between the gas vent and the spark suppressor were to ignite, the spark suppressor will prevent any backfiring into the interior of the battery.

As another feature of this invention, the bottom of each labyrinth chamber slopes off toward the gas vent. Consequently, any acid accumulating in the labyrinth chambers due to improper handling of the storage battery or to acid precipitation in the labyrinth chambers will flow back toward the battery cells, i.e. this design makes it possible for the acid that has seeped out to flow back into the cells. Not until there is sufficiently high internal pressure will seeped-out acid be forced against the slope of the bottom of the labyrinth chamber and into the degassing duct.

As another feature of this invention, the port opening of each cell is sealed in gas-tight fashion by means of a plug. This prevents an uncontrolled discharge of gas and of acid. In addition, an O-ring gasket is provided between each plug and the upper cover panel, sealing the chambers situated between the upper and the lower cover panel against the atmosphere surrounding the battery. Finally, an O-ring gasket provided between the plug and the lower cover panel seals the chambers situated between the upper and lower cover panels against the interior of the cells.

For a controlled degassing and to allow for acid precipitation, the interior of the cells is fluidically connected to the labyrinth chambers by way of an orifice in the outer surface of of the plug. That orifice is closed off by a valve, preferably a relief pressure valve or a sealing diaphragm. This serves to ensure that any degassing of the battery cells as well as the discharge of acid for instance by acid precipitation cannot occur in uncontrolled fashion but will instead take place in a controlled manner through the gating orifice in the surface of the plug concerned and into the labyrinth chambers. By virtue of the sloped bottom of the labyrinth chambers the discharged acid will be directed back toward the outlet and will not be forced through the degassing duct toward the gas vent except when the internal pressure has built up to a corresponding level. The collecting chamber provided underneath the gas vent collects the acid that has penetrated, whereby in desirable fashion the acid is prevented from flowing through the gas vent and to the outside.

BRIEF DESCRIPTION OF THE DRAWINGS

Other advantages and features of this invention are explained in the following description with the aid of the drawings in which

DETAILED DESCRIPTION OF THE PREFERRED EMBODIMENT

Figure 1:
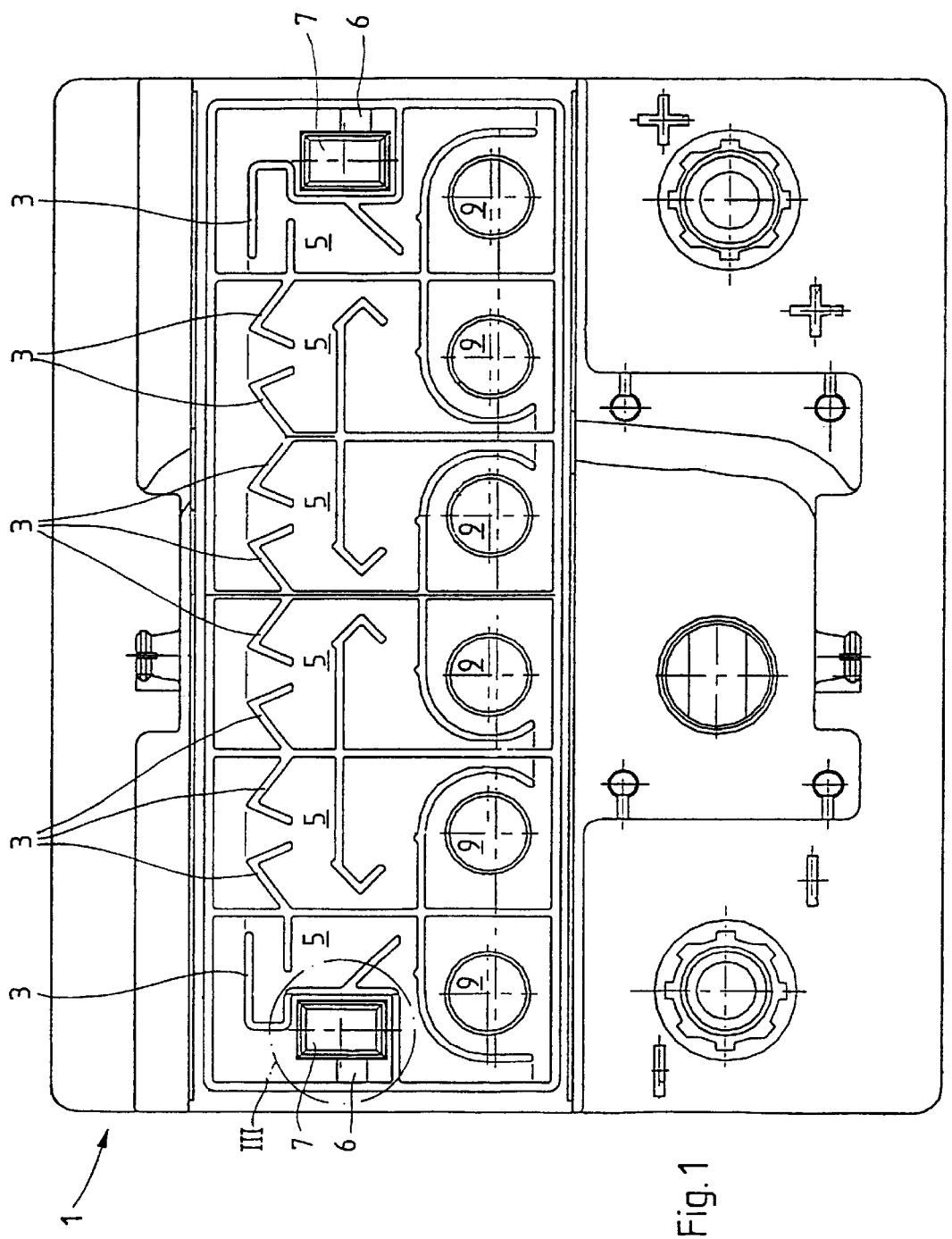
Figure 2:
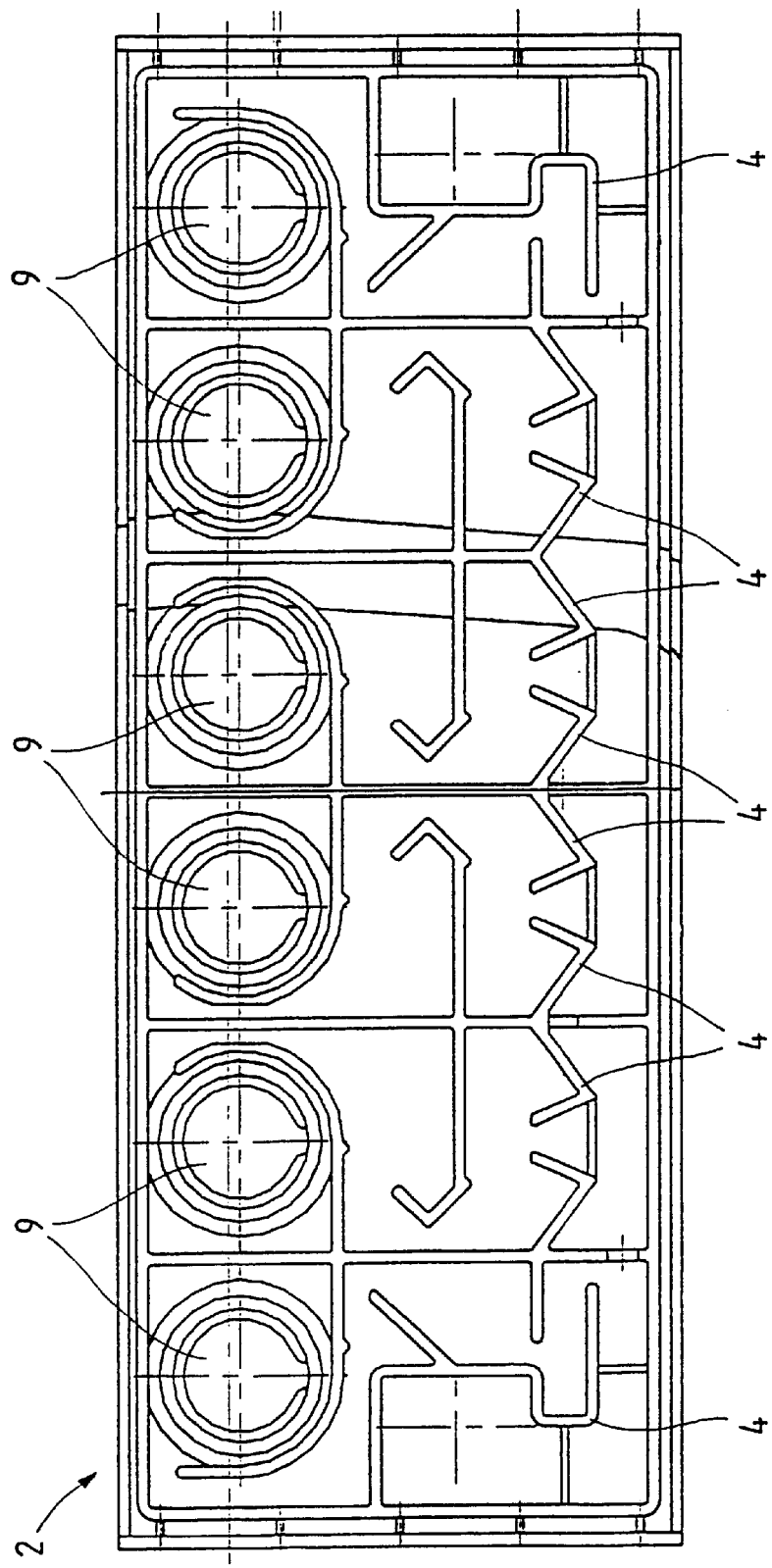

FIG. 1 is a top view of a lower cover panel;

FIG. 2 is a bottom view of the upper cover panel

Figure 3:
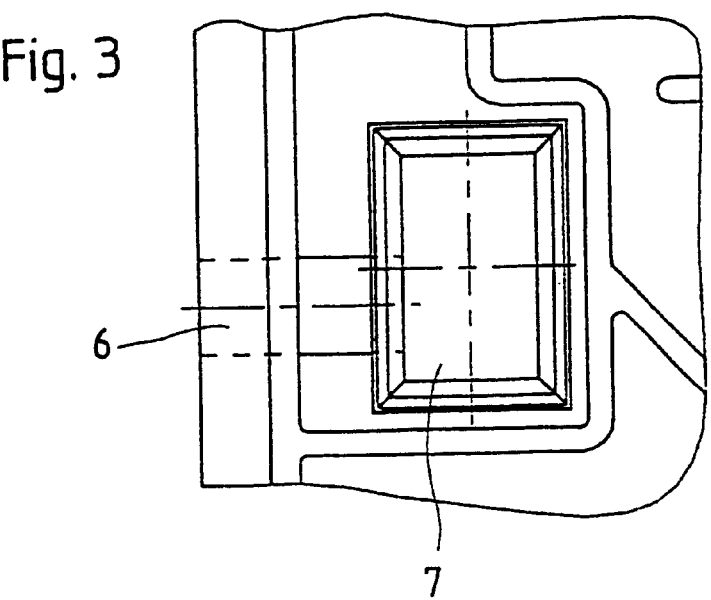
Figure 4:
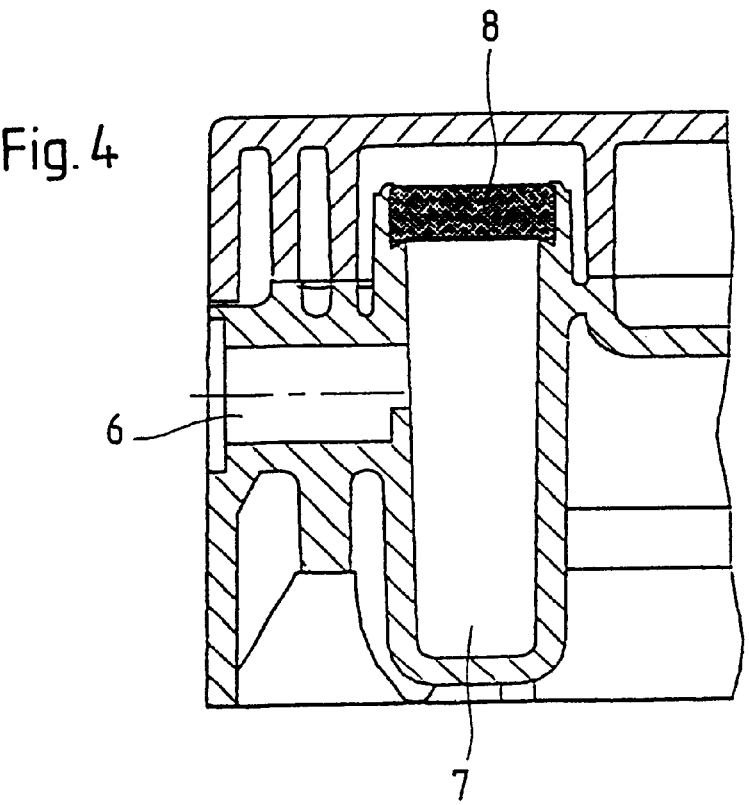

FIG. 3 is a detail of FIG. 1;

FIG. 4 is a partial, lateral section of a collecting chamber.

FIG. 1 is a top view of the lower cover panel 1 of the housing cover assembly of a battery, consisting of an upper and a lower cover panel 2, 1. FIG. 2 is a bottom view of the upper cover panel 2. The housing cover is formed by connecting the lower cover panel 1 and the upper cover panel 2 in gas-tight fashion, for instance by welding or cementing.

The top surface of the lower cover panel 1 features a multiple array of upward-pointing ridges 3. The upper cover panel 2 is configured to match the lower cover panel 1 and is provided with downward-pointing ridges 4 which are solidly connected with the ridges 3 of the lower cover panel 1, preferably by welding or cementing. The upper panel 2 additionally features retaining ridges 10 which serve to minimize the advance of acid in an inverted position while at the same time delaying the exiting of the acid. In the cavity between the upper and lower cover panels 2, 1 the ridges 3, 4 define a multiplicity of labyrinth chambers 5. These labyrinth chambers 5 serve to precipitate the acid.

The upper and lower cover panels 2, 1 are additionally provided with cell port openings 9. In the ready-state of the storage battery these cell ports 9 are sealed in gas-tight fashion by means of plugs, not illustrated in the figures. Each plug has an orifice by way of which the interior of the cells is fluidically connected to the labyrinth chambers 5 to permit acid precipitation. These orifices in the plugs permit the venting of gas of the respective cells. The acid vapor emitted by the cell is carried into the labyrinth chambers 5 where it is precipitated. The bottom surface of each labyrinth chamber is sloped so that the acid precipitated from the vapor flows back toward the cell ports 9 and into the cells via the orifices provided in the plugs.

To avoid the build-up of excessive interior pressure, the gas produced especially during the battery charging process as a result of chemical reactions is discharged from the labyrinth chambers 5 through the gas vent 6 situated on the front of the lower cover panel 1, and into the atmosphere surrounding the battery. This prevents the attainment of a critical overpressure level due to gas build-up inside the cells. An enlarged detail in FIG. 3 shows the gas vent.

A spark suppressor 8 provided upstream of the gas vent 6 in the flow direction of the exiting gas serves to prevent backfiring into the interior of the battery. This is most clearly depicted in FIG. 4. Also shown in FIG. 4 is the degassing duct with a widened section which is located in the area between the spark suppressor 8 and the gas vent 6, constituting a collecting chamber 7. In the normal position of the battery the collecting chamber 7 will always be positioned underneath the gas vent 6. The collecting chamber 7 serves the purpose of trapping residual quantities of acid which have penetrated through the spark suppressor 8 for instance due to improper handling or to excessive internal pressure. This is an advantageous way to prevent acid from leaking through the gas vent 6. The gas vent 6 extends essentially perpendicular to the flow direction through the spark suppressor, thus assuring adequate degassing under all operating conditions without interfering with the function of the collecting chamber 7.

The collecting chamber 7 also prevents water and dirt particles from penetrating into the cells via the gas vent 6. Any water that has entered through the gas vent 6 will accumulate by gravity in the collecting chamber 7 situated underneath the gas vent 6. Similarly, any dirt particles that may have entered via the gas vent 6 will be deposited in the collecting chamber 7, which prevents any clogging of the spark suppressor 8. This eliminates the possibility of a high, uncontrolled pressure build-up within the battery housing due to a soiled or clogged spark suppressor 8.

The elevated position of the spark suppressor 8 in the lower cover panel 1 also has the effect of creating a comparably longer path which any acid flowing toward the gas vent must travel in the operating position of the battery, thus adding another element of reassurance.

What is claimed is:

1. Multi-cell storage battery comprising a housing and, enclosing the housing in gas-tight fashion, a housing cover assembly including an upper cover panel and a lower cover panel, with a degassing duct between the upper and lower cover panels which encompasses a multiple array of interconnected, mutually matched labyrinth chambers, fluidically links all cells, opens out at a forward end into at least one gas vent, and is closed off by a spark suppressor, wherein the gas vent is positioned at an essentially perpendicular angle relative to a direction of flow through the spark suppressor and, in the area between the spark suppressor and the gas vent, the degassing duct is provided with a widened section forming a collecting chamber which, when the storage battery is in a normal position, is situated underneath the gas vent.

2. Storage battery as in claim 1, wherein the collecting chamber is sufficiently large to hold acid as well as any fluids and dirt particles entering through the gas vent.

3. Storage battery as in claim 1, wherein a bottom of the labyrinth chambers slopes off toward the gas vent.

4. Storage battery as in claim 1, wherein the upper cover panel is provided with retaining ridges.

5. Storage battery as in claim 1, wherein each cell comprises a port opening which is closed off in gas-tight fashion by a plug.

6. Storage battery as in claim 5, wherein the plug butts against the upper cover panel via a continuous circular gasket, sealing the labyrinth chambers situated between the upper and lower cover panels against an ambient atmosphere surrounding the battery.

7. Storage battery as in claim 6, wherein the circular gasket is an O-ring gasket integrally molded onto the plug.

8. Storage battery as in claim 5, wherein the plug butts against the lower cover panel via a continuous circular gasket sealing the labyrinth chambers situated between the upper and lower cover panels against an interior of the cells.

9. Storage battery as in claim 8, wherein the gasket is a lamellar gasket.

10. Storage battery as in claim 5, wherein, for acid precipitation, an orifice in an outer surface of the plug fluidically connects an interior of the cells to the labyrinth chambers.

11. Storage battery as in claim 10, wherein the orifice is provided with a valve.

12. Storage battery as in claim 11, wherein the valve is a relief pressure valve.

13. Storage battery as in claim 11, wherein the valve is a pressure diaphragm which is at least at one point provided with a perforation constituting a gating orifice.

* * * * *